(12) United States Patent
Kemp (10) Patent No.: US 7,618,673 B2
(45) Date of Patent: Nov. 17, 2009

(54) DECONTAMINATION OF ANIMAL FEED CONTAINING PRION (EG BSE AGENT)

(75) Inventor: Philip William Kemp, Queensland (AU)

(73) Assignee: Austech Sterile Resource Recovery Pty Ltd, Queensland (AU)

( * ) Notice: Subject to any disclaimer, the term of this patent is extended or adjusted under 35 U.S.C. 154(b) by 989 days.

(21) Appl. No.: 10/416,602

(22) PCT Filed: Nov. 14, 2001

(86) PCT No.: PCT/AU01/01474

§ 371 (c)(1),
(2), (4) Date: Sep. 15, 2003

(87) PCT Pub. No.: WO02/39826

PCT Pub. Date: May 23, 2002

(65) Prior Publication Data

US 2004/0062832 A1    Apr. 1, 2004

(30) Foreign Application Priority Data

Nov. 15, 2000    (AU) ..................... PR1527

(51) Int. Cl.
*A23K 1/00* (2006.01)
*C05F 1/00* (2006.01)

(52) U.S. Cl. .............................. 426/635; 426/807; 71/15
(58) Field of Classification Search ................. 426/635, 426/807; 71/15
See application file for complete search history.

(56) References Cited

U.S. PATENT DOCUMENTS

| 4,042,718 A | 8/1977 | Rawlings et al. |
| 4,225,620 A | 9/1980 | Rawlings et al. |
| 5,087,474 A | 2/1992 | Moore |
| 5,514,388 A | 5/1996 | Rohwer |
| 5,780,288 A | 7/1998 | Rahwer |

FOREIGN PATENT DOCUMENTS

| AU | B13732/92 | 10/1991 |
| AU | B52616/93 | 7/1993 |
| EP | 0 499 260 A2 | 8/1992 |
| FR | 2 586 163 A1 | 2/1987 |
| GB | 1 558 590 A | 1/1980 |

OTHER PUBLICATIONS

Taylor, Journal of Food Safety, vol. 18, pp. 265-274, 1998.*
F. Taguchi, et al., "Proposal for a procedure for complete inactivation of the Creutzfeldt-Jakob disease agent", Archives of Virology, 119:297-301, 1991.
D. M. Taylor, et al., "Decontamination studies with the agents of bovine spongiform encephalopathy and scrapie", Archives of Virology, 139: 313-326, 1994.
Journal of Hospital Infection, 1999, vol. 43 (supplement), Taylor, "Inactivation of prions by physical and chemical means", p. S69-S76.
The Veterinary Journal, 2000, vol. 159, Taylor "Inactivation of transmissible degenerative encephalopathy agents: A review", pp. 10-17.
Arch Virol, 1992, vol. 124. DiMartino, et al., "Purification of non-infectious ganglioside preparations from scrapie-infected brain tissue", pp. 111-121.
Journal of Virological Methods, 1993, vol. 41, Ernst and Race, "Comparative analysis of scraple agent inactivation methods", pp. 193-202.
The Veterinary Journal, 1995, vol. 137, Taylor, et al., "Inactivation of the bovine spongiform encephalopathy agent by rendering procedures", pp. 605-610.

* cited by examiner

*Primary Examiner*—C. Sayala
(74) *Attorney, Agent, or Firm*—Tarolli, Sundheim, Covell & Tummino LLP (57) ABSTRACT

A method of producing an animal feed that is free from transmittable degenerativeencephalopathies is provided. Central to the method is alkali treatment of animalmaterial at a pH of at least 8.5 under temperature conditions below 100 C at atmospheric pressure. This method provides a decontaminated animal feed produced under relatively low temperature and pressure conditions that are achievable instandard animal carcass rendering facilities.

8 Claims, 6 Drawing Sheets

DECONTAMINATION OF ANIMAL FEED CONTAINING PRION (EG BSE AGENT)

FIELD OF THE INVENTION

THIS INVENTION relates to a method of producing an animal feed. More particularly, this invention relates to a method of producing an animal feed from animal by-products where treatment with alkali and heat eliminates or reduces transmittable degenerative encephalopathies such as Bovine Spongiform Encephalopathy, Creutzfeldt-Jacob Disease and scrapie.

BACKGROUND OF THE INVENTION

Transmittable Degenerative Encephalopathies (TDE) include bovine spongiform encephalopathy (BSE or "mad cow disease"), scrapie in sheep, Creutzfeldt-Jacob Disease (CJD), Gerstman-Straussler Schemker (GSS) and Kuru in humans. These diseases have achieved considerable notoriety in recent years at least partly due to the perception that authorities failed to monitor incorporation of BSE-contaminated beef into human and animal food supplies, which led to outbreaks of CJD, mainly in the United Kingdom (see Editorial in Nature, 1997, 389 423).

It is now well established that the agent responsible for TDE transmission is a protein, generally referred to as a "prion" protein, which underlies both BSE and CJD (Hill et al., Nature 1997, 389 448).

Generally, it has been concluded that the destruction of TDE in meat requires treatment at 132° C. for 20 minutes under 3 bars pressure. Alternatively, in the presence of alkali the temperature and pressure may be reduced to 121° C. and 2 bars respectively.

Alkali is known for its hydrolytic effect upon biomolecules such as proteins, and efforts to sterilize animal tissue contaminated with TDE have utilized alkali treatment, heat and pressure as means for destroying prion pathogenicity.

For example, Taguchi et al., 1991, Arch. Virol. 119 297 used a 1 hour treatment with 1 N NaOH followed by autoclaving at 121° C. for 30 minutes to inactivate CJD-infected brain homogenates. Ernst & Race, 1993, J. Virol. Methods 41 193 employed autoclaving together with NaOH and LpH treatment inactivate scrapie-infected brain homogenates.

A more extensive series of tests was performed by Taylor et al., 1994. Arch. Virol. 139 131 to decontaminate BSE-infected bovine brain or scrapie-inifected rodent brain samples. Treatments included 1 M or 2 M NaOH for up to 1 hour, autoclaving at temperatures between 134° C. and 138° C. for up to 1 hour or treatment with sodium hypochlorite or sodium dichloroisocyanurate for up to 2 hours. These authors concluded that none of the procedures tested produced complete TDE inactivation.

The problem for manufacture of animal feed from potentially TDE-infected animal tissue is that high temperature and pressure conditions are not readily achievable using standard rendering or animal waste recycling equipment. Also, high temperature treatments during manufacture of animal feed tend to produce an inferior feed having unwanted by-products such as carcinogens, di-amino acids and volatile odours.

OBJECT OF THE INVENTION

It is therefore an object of the invention to provide a method of manufacturing animal feed where the potential for TDE contamination is at least reduced, if not eliminated.

SUMMARY OF THE INVENTION

In one aspect the present invention resides in a method of manufacturing an animal feed including the steps of:
(i) adding alkali to animal material to maintain a pH of at least 8.5;
(ii) heating the material at step (i) to a temperature in the range 55° C. to 99° C.; and
(iii) dehydrating the material produced at step (ii).

In another aspect the present invention resides in a method of manufacturing a TDE-decontaminated animal feed including the steps of:
(i) adding alkali to TDE-contaminated animal material to maintain a pH of at least 8.5;
(ii) heating the material at step (i) to a temperature in the range 55° C. to 99° C.; and
(iii) dehydrating the material produced at step (ii).

Suitably, the method of the invention is performed at about atmospheric pressure.

Preferably, sufficient alkali is added to maintain a pH of at least 9.5.

More preferably, sufficient alkali is added to maintain a pH in the range 10.5 to 13.0.

Even more preferably, sufficient alkali is added to maintain a pH in the range 11.0-11.5.

Preferably, the alkali is calcium hydroxide such as in the form of hydrated lime.

Preferably, the material at step (ii) is heated to a temperature in the range 60° C. to 90° C.

In one particular embodiment, the temperature is about 60° C.

In another particular embodiment, the temperature is 80° C.-85° C.

The duration of steps (i) and (ii), termed the "hydrolytic phase", is preferably 1 to 4 hr or more preferably 1 to 2 hr.

After this hydrolytic phase, the treated animal material may be stored prior to dehydration or immediately dehydrated.

With regard to dehydration, it is preferred that the moisture content of the animal feed is no greater than 10-15 wt %. Typically, with time the level of moisture may drop to about 7-8 wt % which is optimal for the animal feed of the invention.

In yet another aspect, the invention provides an animal feed produced according to the process of the first-mentioned aspect.

In still yet another aspect, the invention provides a TDE-decontaminated animal feed produced according to the process of the second-mentioned aspect.

The invention also provides TDE-decontaminated animal material produced according to steps (i) and (ii) of the second-mentioned aspect of the invention.

The invention also extends to use of the animal feed of the aforementioned aspects as a fertilizer.

Throughout this specification, unless otherwise indicated, "comprise", "comprises" and "comprising" are used inclusively rather than exclusively, so that a stated integer or group of integers may include one or more other non-stated integers or groups of integers.

BRIEF DESCRIPTION OF THE FIGURES AND TABLES

Table 1: Final pH of variously treated meat samples.

Table 2: Summary of prion protein clearance rates of TDE-spiked meat samples after alkali and heat treatment.

DETAILED DESCRIPTION OF THE INVENTION

The present invention arises from the unexpected discovery by the present inventor that alkali-treated animal material subjected to mild heat treatment at atmospheric pressure will effectively destroy TDE. Minimizing heat treatment is also relevant to the fact that the animal feed must be highly digestible, particularly with respect to protein content, as well as being TDE free. Furthermore, excessive heat will generate unwanted products such as cross-linked amino acids, racemization of L-amino acids to their D-isomers and formation of mutagens such as 2-amino 3,8-diethylimidazole [4,5f] quinoline. Also, it is important that minimal volatilization occurs during manufacture, so that noxious odour production is minimized. To these ends, the present invention minimizes heat treatment during manufacture at atmospheric pressure while utilizing alkali and dehydration steps to effectively sterilize the animal feed with respect to TDE. The manufacturing conditions provided by the present invention are readily within the capabilities of many standard commercial animal food manufacturing facilities, or can be utilized with only minor modifications of such facilities.

The animal materials which may be used include, for Example, animal wastes and offals from slaughter works; domestic animals of little commercial value such as cast for age or drought-affected sheep or cattle, or flock reduction sheep; waste or discarded wildlife carcasses or parts thereof; poultry offal or cast for age poultry; fish or crayfish offals or non-usable species from catches.

The animal material is preferably mixed in bulk with a dry dehydrating material which is capable of absorbing moisture (either chemically or physically) from the animal material, reducing the percentage of water content in the material to a dry stable product.

The dehydrating materials include at least one or more of the combinations of:

bentonites, zeolites, kaolins or other clays in a ratio not exceeding 35% (w/w);

calcium oxide, magnesium oxide or aluminium oxide in a ratio not exceeding 35% (w/w);

diatomite or other diamataceous earths in a ratio not exceeding 35% (w/w);

gypsum, dolomite, limestone, sodium bicarbonate or salt in a ratio not exceeding 35% (w/w);

calcium phosphates and/or phosphoric acid in a ratio not exceeding 35% (w/w);

ferrous sulphate and/or ferric sulphate in a ratio not exceeding 35% (w/w);

grains, starches and gelatinous materials and byproducts of grains (for example, pollard, bran, hulls and the like) including extruded forms in a ratio not exceeding 80% (w/w);

protein grains and oilseed grains and their byproducts including processed and extruded forms of protein meals in a ratio not exceeding 80% (w/w);

vegetable products and byproducts such as copra meal and palm kernel meal, gin trash and chopped hay and straw in a ratio not exceeding 75% (w/w) and animal byproducts such as meat meals, bone meals and blood meals and gelatinous materials in a ratio not exceeding 75% (w/w).

The preferred dehydrating materials which can be used are varied and will depend on several factors including:

1. The proximity and cost of the dehydrating material to the dehydrating facility.
2. The rate at which the dehydrating needs to be carried out.
3. The intended use of the resultant dried product.

Dehydration is preferably performed in a rotary drier.

The alkali used at step (i) may include oxides, hydroxides and salts of the metallic elements. Examples include calcium oxide, calcium hydroxide, sodium hydroxide, sodium carbonate, sodium sulphite, potassium hydroxide, potassium carbonate, magnesium hydroxide, magnesium carbonate, magnesium sulphate or any two or more in combination.

Preferably, the alkali is in the form of calcium hydroxide (hydrated lime).

The concentration of alkali used at step (i) will depend on the desired pH, the particular alkali used and the buffering capacity of the animal and other materials used during manufacture.

For example, a typical ratio is 25 kg hydrated lime to 1200 kg wet animal material.

Dependent on the material with which the product is to be mixed, the pH level may be adjusted by the addition of acid.

During manufacture, optional additional materials may be added which will enhance the nutritional or economic value of the finished product. Such additional materials (although not limited to) may include, for example, rumen modifiers such as monensen or avoparcin, enzymes or bacterial cultures; additional vitamins or minerals; non protein nitrogen sources such as urea; antioxidants, stabilizers, antibiotics, mould inhibitors, preservatives (including salt) and the like; protein and lipid modifiers to alter their rumen digestibility; palatability enhancers such as molasses and byproducts of molasses fermentation.

Preferably, following drying the animal feed is left to stand for 24 hours before being fed directly to livestock (both ruminants and monogastrics) in a granular or block form or as a milled fine powder.

The animal feed may be mixed with feed supplements, trace elements, protein meals, cereal protein and oilseed grains, molasses or byproducts of molasses fermentation, hay or the like in any combination for livestock (both ruminant and monogastric) feeding; it may be used as a pet food either as produce or mixed with other materials; and/or it may be used directly or as an ingredient in food for human consumption. Generally the dried material will be mixed at a maximum of 10-15% (w/w) of the final product.

Some examples of the manufactured animal feed are:

1. Defatted abattoir solids fractions (typically <10% fat on a dry matter basis) plus stickwater are mixed with calcium hydroxide to give the required pH of 11 (approximately 1:30 w/w on a dry matter basis) and allowed to stand in a surge bin for 1 hour. The product is then dried at 80° C. in a rotary dryer over 1 hour to give a resultant product of <10% free moisture which is then milled to a fine meal.
2. Defatted abattoir solids fractions (typically <10% fat on a dry matter basis) are mixed with calcium hydroxide to give the required pH of 10 (approximately 1:50 on a dry matter basis) and allowed to stand in a surge bin for 30 minutes and then dried in a rotary drier with some solar heat input over 3 hours at 60° C. to give a resultant product of <10% moisture. This product is then milled to a fine meal.
3. Raw waste fish material is mixed with alkali consisting of 80% calcium hydroxide and 20% sodium hydroxide to a pH of 10.5 (approximately 1:40 on a dry matter basis) and dried in a rotary dryer at 70° C. over 4 hours to give a resultant product of <11% moisture which is then milled to a fine meal.

Although there is yet to be detected any infective TDE in domestic animals other than ruminants (for example fish and poultry), there are bans on the feeding of protein meals of broad animal origin in some countries. For example, in Australia and the U.S. there is a ban on the feeding of any protein meal of animal origin to ruminant animals. In many European countries, there is a total ban on the feeding of any protein meal of animal origin to all animal species. These bans exist for the fear of infective TDE eventually being detected in animals other than ruminants It will also be appreciated that the animal feed of the invention may be used as a TDE-decontaminated fertilizer.

To enable the invention to be fully understood, preferred embodiments will now be described with reference to the accompanying drawing (FIG. 1) which is a schematic diagram of the apparatus employed in the method of the present invention.

Figure 1:
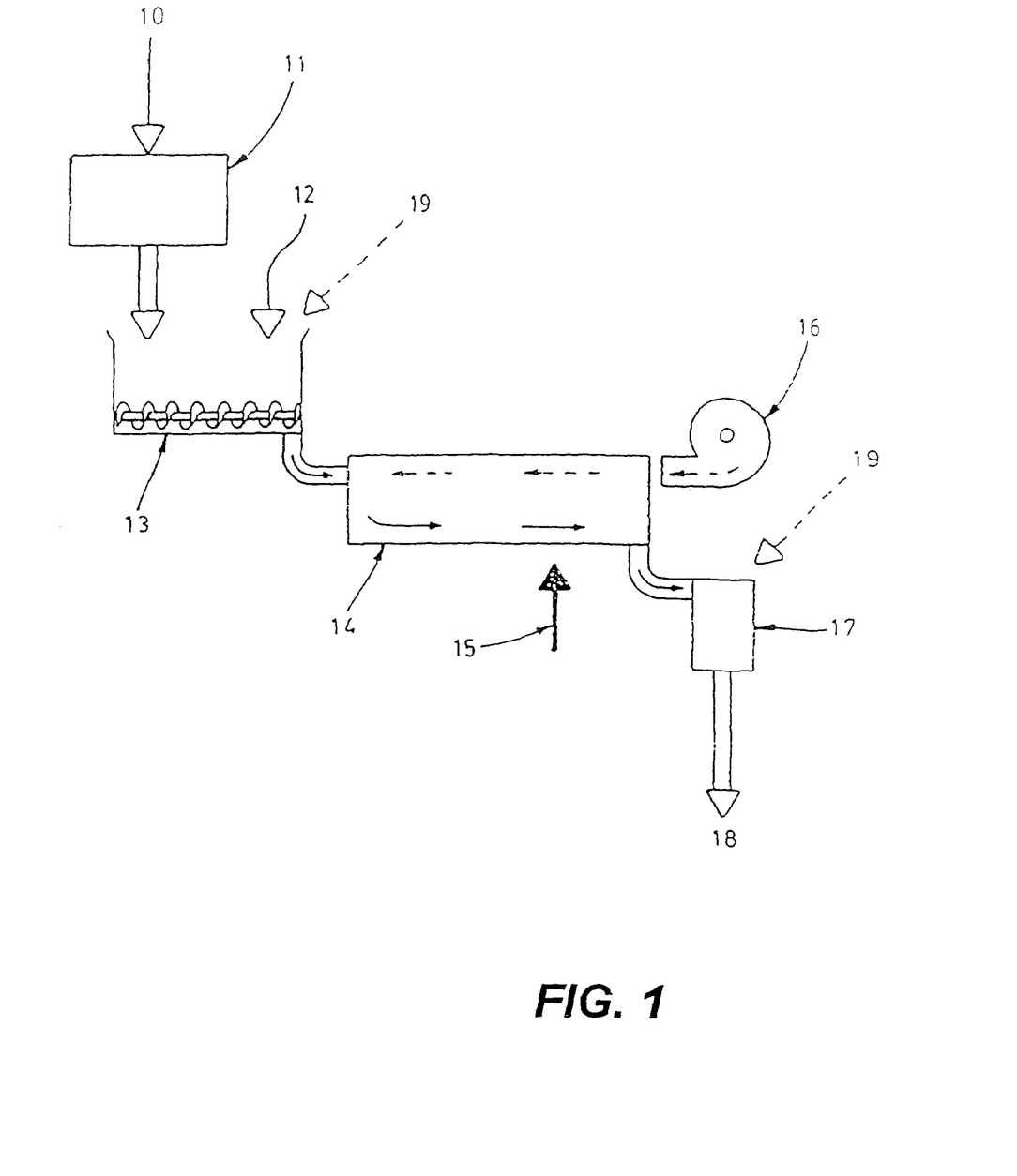
FIG. 1: Example of apparatus for producing an animal feed.
Figure 2:
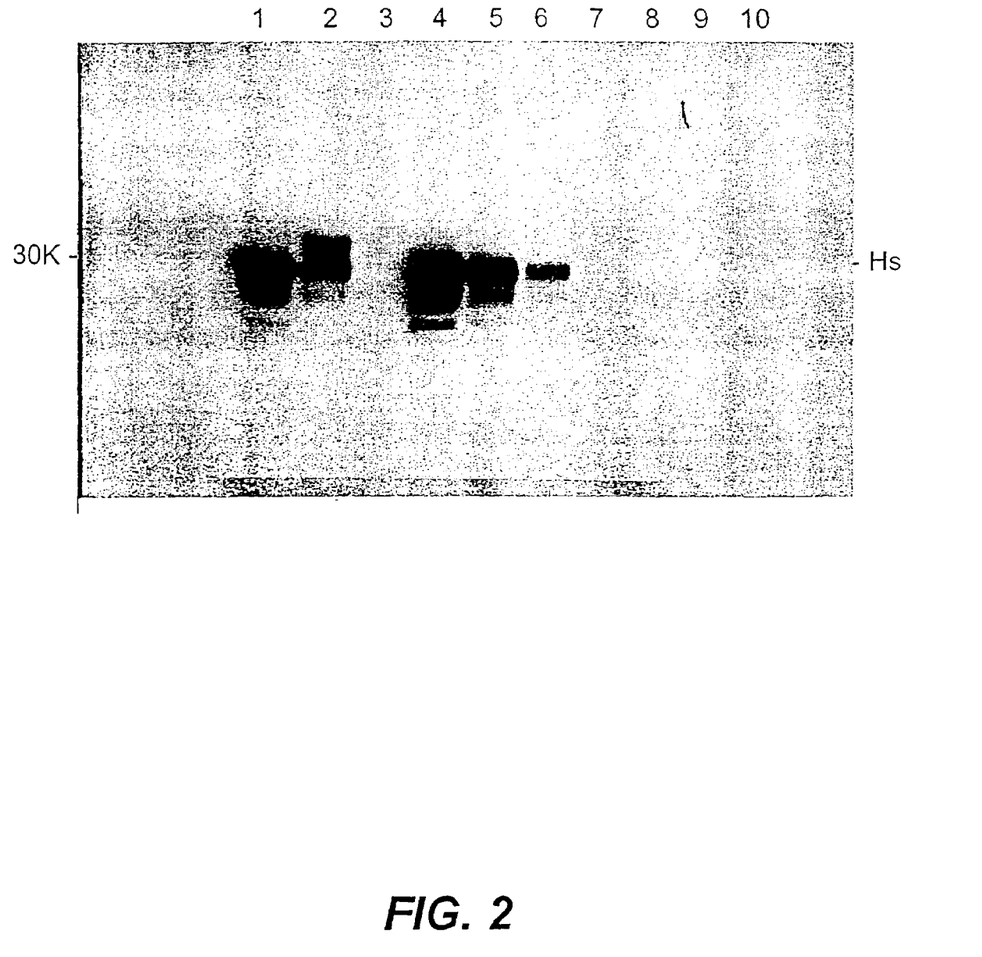
FIG. 2: Titration of 263K stock SP0172200. Lane 1: Proteinase K digested 263K Hs stock, $10^{-2.1}$. Lane 2: Undigested 263K Hs stock, $10^{-2.1}$. Lane 3: Low molecular weight rainbow markers. Lanes 4-10: Serial 5-fold dilutions of proteinase K digested 263K stock from $10^{-1.4}$ to $10^{-5.6}$ dilution respectively.
Figure 3:
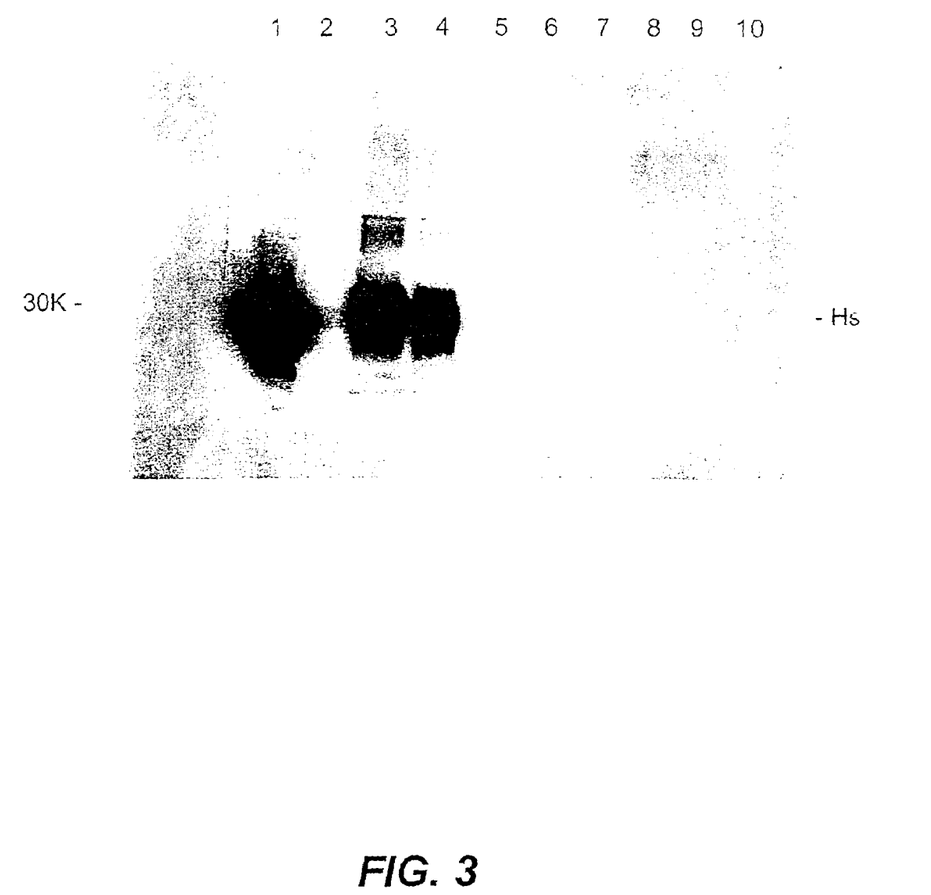
FIG. 3: Analysis of process samples following proteinase K digestion. Lane 1: Proteinase K digested 263K Hs stock, $10^{-2.1}$. Lane 2: Low Molecular ratio rainbow markers. Lane 3: Proteinase K digested 287.1A. Lane 4: Proteinase K digested 287.1-1. Lane 5: Boiling Mix 1×. Lane 6: Boiling Mix 1×. Lane 7: Proteinase K digested 287.1-2. Lane 8: Proteinase K digested 287.1-3. Lane 9: Proteinase K digested 387.1-4. Lane 10: Boiling Mix 1×.
Figure 4:
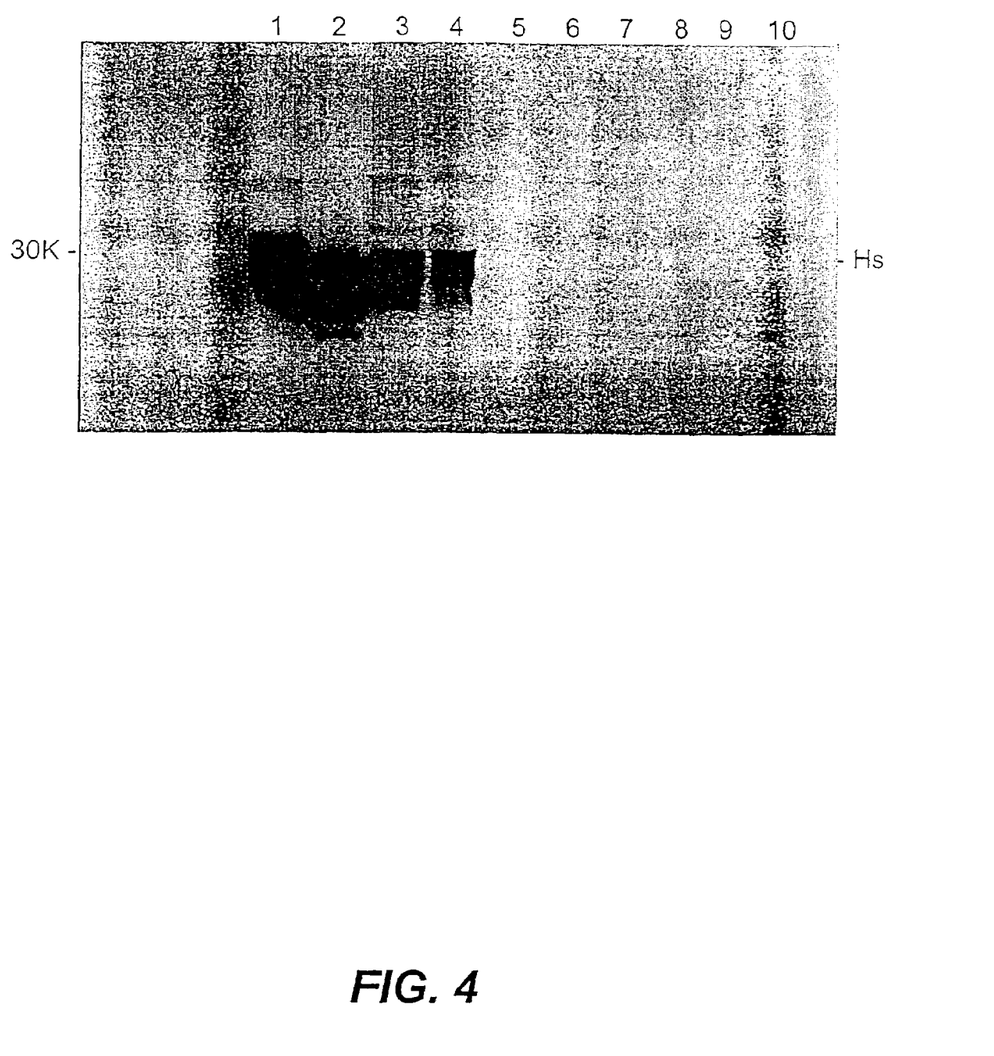
FIG. 4: Analysis of undigested process samples. Lane 1: Undigested 263K Hs stock, $10^{-2.1}$. Lane 2: Proteinase K digested 263K Hs stock, $10^{-2.1}$. Lane 3: Undigested 287.1A. Lane 4: Undigested 287.1-1. Lane 5: Low Molecular ratio rainbow markers. Lane 6: Boiling Mix 1×. Lane 7: Undigested 287.1-2. Lane 8: Undigested 287.1-3. Lane 9: Undigested 287.1-4. Lane 10: Boiling Mix 1×.

With regard to the method of the invention, the dehydrating material is mixed with the raw animal material and then heated and dried. It is usual to mix all materials at the start but not essential as any ingredient can be introduced at any time during the process. Once mixed, the material is then dried. Any heated drying system may be used but a normal heated air flow system is usually most practical.

Referring to FIG. 1, animal wastes 10 (eg. cattle carcasses) are passed through a mincer or hogger 11 before alkali 12 (preferably calcium hydroxide) is added and mixed in mixer 13.

After mincing and before addition of alkali 12, animal waste 10 may be heated to liquefy the tallow component. The heated animal waste is then decanted or pressed to create a solid and liquid fraction.

The liquid fraction is acidified and separated into a tallow fraction, other liquids (mostly water) and residual solids (referred to as "stickwater"). This stickwater may be processed separately or combined with the solid fraction for alkali and heat treatment.

In this example, addition of alkali 12 (preferably calcium hydroxide) raises the pH of the mixture to about pH 11.0-11.5. During this "hydrolytic phase" the pH should be maintained at least at 8.5 or preferably pH 9.5 for 1-4 hrs. The pH may fall as protein hydrolysis occurs, so it is preferable to start at a pH of at least 11.0 so that the pH never falls below pH 8.5, or preferably pH 9.5.

During this hydrolytic phase, the temperature may be maintained at 60° C. for a longer period (say 3 hr) so as to reduce energy consumption or may be maintained at 80-85° C. for a shorter period (say 1 hr).

The mixture is then conveyed (eg. by an auger) to a trommel dryer 14 which is provided with a counter-current airflow by an air fan or blower 16 heated by heater 15. Preferably, it is at this point that optional dehydrating materials (e.g. bentonite, zeolite, limestone, milled cereal grain) are added to the dryer to facilitate the dehydration process.

The animal feed will normally exit the dryer 14 with about 10-11% (w/w) moisture content. This moisture content has been found to decrease to about 7-8% (w/w) over 24-48 hr post-drying due to continued protein hydrolysis.

The dried animal feed is conveyed to a hammer mill 17 for grinding to a desired granule/powder size and the granulated/powder feed material is conveyed to a packaging/transport area 18.

Where the product is to be used for direct feeding eg in fish feed, acid 19 may be added to the mixer 13 (after the initial mixing has occurred) or to the hammer mill 17 to reduce the pH of the final product e.g. to pH 6.5-7.5.

Where the product is to be mixed with acidic materials such as grain, the addition of acid may not be required as the alkaline product may be balanced by the acidity of the grain.

It will be readily apparent to the skilled addressee that valuable feed, preferably for animals but also suitable for human consumption, can be produced from animal tissue, substantially free of TDE contamination or having a least reduced likelihood of TDE contamination, and that the resultant feed is suitable for a wide range of potential uses, including use as a fertilizer.

So that the invention may be more readily understood and put into practical effect, the skilled person is referred to the following Examples.

EXAMPLE 1

Minced silverside was bought from a local butcher and 4×10 g aliquots weighed out. Two of the aliquots were placed into metal beakers, spiked with 1 mL 263K hamster scrapie crude brain homogenate (cHs) and mixed thoroughly. To both beakers 20 mL of 5% calcium hydroxide solution was added, stirred, covered with foil and then placed in a 60° C. waterbath for twelve hours. The solution was stirred approximately every 30 minutes over the 12 hour incubation.

To the third 10 g aliquot of meat, 1 mL of cHs was added, mixed thoroughly and 20 mL of 1% SDS solution then added. This mixture was placed on an 'end over end' mixer for 10 minutes. The mix was then boiled for 5 minutes, clarified, aliquoted and frozen at −80° C. This constitutes 287.1 A cHs sample.

The final 10 g aliquot was placed into a metal beaker, spiked with 1 mL cHs, mixed thoroughly and then placed into the 60° C. oven to air-dry. Again, sample was mixed approximately every 30 minutes. Once dry, the dehydrated meat was removed from the oven and ground using a mortar and pestle. The ground meat was mixed with 20 ml of 1× Boiling Mix, placed on the 'end over end' mixer, mixed for 12 hours at ambient temperature, then clarified and aliquoted. This constitutes the 287.1-1 cHs sample.

After 12 hours in the 60° C. waterbath, the two metal beakers were removed. One beaker was placed into the 60° C. oven and air-dried with intermittent stirring, as above. The material from the second beaker was placed into a centrifuge tube and the pH adjusted to pH of 7.5. 22 mL of 1× Boilinq Mix was added, placed on the 'end over end' and left to mix for 12 hours at ambient temperature. This was then clarified, aliquoted and frozen at −80° C. This constitutes the 287.1-2 cHs sample.

After dehydration at 60° C., the hydrolysed meat was removed from the over and ground down using a mortar and pestle. 20 mL of 50 mM sodium acetate was added to the ground meat and the pH adjusted to pH 7.5. 23 mL of 2× boiling mix was added and the tube placed on the 'end over end' mixer to mix for 12 hours at ambient temperature. This was then clarified, aliquoted and frozen at −80° C. This constitutes the 287.1-3 cHs sample.

The pellet remaining from the 287.1-3cHs sample was resuspended and incubated with 10 mL of 50 mM sodium acetate buffer (pH 6.0), placed on the 'end over end' mixer for 60 minutes at ambient temperature. This was then clarified, aliquoted and frozen at −80° C. This constitutes the 287.1-4 cHs sample.

Western blots were then performed on the samples. Western Blot analysis of 263K hamster scrapie involves the use of the specific monoclonal antibody, 3F4. 3F4 recognises both the normal cellular form of the prion protein, $PrP^{Sc}$, and the disease associated form, $PrP^{Sc}$. Unlike the normal cellular form, $PrP^{Sc}$ is relatively protease resistant, and as proteinase K digestion of samples can be used to distinguish $PrP^{Sc}$ from $PrP^{c}$. Proteinase K digestion of process samples is also useful for removing proteins present in the process samples that could cause non-specific or cross-reactive background staining in the Western blot assay.

FIG. 2 shows a titration of the 263K hamster adapted scrapie stock used in these studies (SP0172200). This shows the typical staining pattern observed for 263K, using 3F4. The full length, mature PrP protein is believed to have an apparent molecular ratio ($M_r$) of ~33,000 daltons (33K, top band lane 2). Following proteinase K digestion, a predominant broad band in the region of 28K, a fainter broad band ~23K, and a sharp but faint band ~19K, are usually observed (see lane 1). Note than in stocks 253K Hs these lower Mr species may also be detected (lane 2), presumably due to endogenous proteases present in, or during the preparation of the stock.

Lanes 4-10 show serial five fold dilutions of the 263K stock, from 1:25 ($10^{-1.4}$) dilution to a 1:390625 ($10^{-5.6}$) dilution, respectively. The 28K $PrP^{Sc}$ species can be detected in lanes 4-7, i.e down to a $10^{-3.5}$ dilution. On longer exposures of this blot (not shown), the 28K species is also detected at $10^{-4.2}$ dilution. The end-point, or titre, of the stock is defined as the first dilution at which the 28K PrP species is no longer detected. The titre of this stock is therefore $10^{-4.9}$, or $7.8\times10^{4}$ arbitrary units/ml.

Western blot analysis of proteinase K digested process samples is shown in FIG. 3. Proteinase K digested 263K Hs stock SP0172200 serves as an internal positive control (lane 1, $10^{-2.1}$ dilution). The 28K PrP species can be seen clearly in samples 287.1A and 287.1-1 (lanes 3 and 4, respectively). A −33K protein species is also observed, suggesting that proteinase K digestion of these samples is incomplete. No protein bands are observed in samples 287.1-2, 287.1-3 or 287.1-4 (lanes 7-9, respectively), suggesting that the alkaline hydrolysis process has removed the $PrP^{Sc}$ proteins. As no $PrP^{Sc}$ species are observed for these samples, they can be taken to have an end-point, or titre, of $10^{0}$ or $1\times10^{0}$ arbitrary units/ml. Note that no estimate of the titre can be made for the 287.1A or 287.1-1 samples.

To confirm that the $PrP^{Sc}$ proteins had not simply been a degraded by the proteinase K digestion step, undigested process samples were analysed by Western blotting (FIG. 4). Both undigested and proteinase K digested 263K Hs stock SP0172200 served as internal positive controls (lanes 1 and 2, respectively). Again, PrP protein species can be seen in samples 287.1A and 287.1-1 (lanes 3 & 4, respectively). No protein bands are evident in samples 287.1-2, 287.1-3 or 287.1-4 (lanes 7-9 respectively), confirming the results in FIG. 3.

EXAMPLE 2

Preliminary tests were performed to investigate the stability of pH following treatment of meat material.

A 5% solution of calcium hydroxide was adjusted to pH 12.0 using hydrochloric acid. 20 mL of this solution was then added to 10 g minced lean beef and the sample mixed thoroughly. The pH was measured and then monitored over about 85 minutes during which time the pH remained at 12.0.

Similarly, 5% calcium hydroxide was adjusted to pH 10.5 and 20 mL was throughly mixed with 10 g minced lean beef. The initial pH was 5.4 and this was adjusted to pH 10.5 by further addition of calcium hydroxide. The pH then fell over the next 25 minutes to pH 10.3.

EXAMPLE 3

Two 10 g aliquots of minced silverside were placed into individual metal beakers and each aliquot spiked with 1 mL of 263K hamster scrapie crude brain homogenate (cHs). 20 mL of calcium hydroxide at pH 12.0 was then added to each beaker, the samples mixed thoroughly and the pH measured as pH 12.0 for both samples. The beakers were then covered with foil and incubated at 75° C. for a total of 3 or 6 hrs (2 or 5 hrs in a waterbath, respectively, with the final 1 hr in an oven).

Four 10 g aliquots of minced silverside were placed into individual metal beakers and each aliquot spiked with 1 mL of 263K hamster scrapie crude brain homogenate (cHs). 18 mL of calcium hydroxide at pH 10.5 was then added to each beaker, the samples mixed thoroughly and the pH adjusted to pH 10.5 (with calcium hydroxide) for all samples. The beakers were then covered with foil and incubated at 60° C. for a total of 3 hrs, 75° C. for a total of 3 or 6 hrs or 90° C. for 3 hrs (initially in a waterbath with the final 1 hr in an oven).

All samples were neutralized to pH 6.5-7.5 on collection and then adjusted to a final concentration of 1% SDS. The samples were mixed end-over-end for approximately 10 minutes at ambient temperature, boiled for 5 minutes and clarified by low speed centrifugation. The supernatant fraction was then collected, aliquoted and stored at −75° C.

The details of the samples are summarized in Table 1.

Samples were analysed by Western blot.

As a control, one 10 g aliquot of minced silverside was spiked with 1 mL of 263K cHs, mixed thoroughly, and 20 ml of 1% SDS added. This sample was mixed end-over-end for approximately 10 minutes at ambient temperature, boiled for 5 minutes and clarified by low speed centrifugation. The supernatant fraction was then collected, aliquoted and stored at −70° C.

Figure 5:
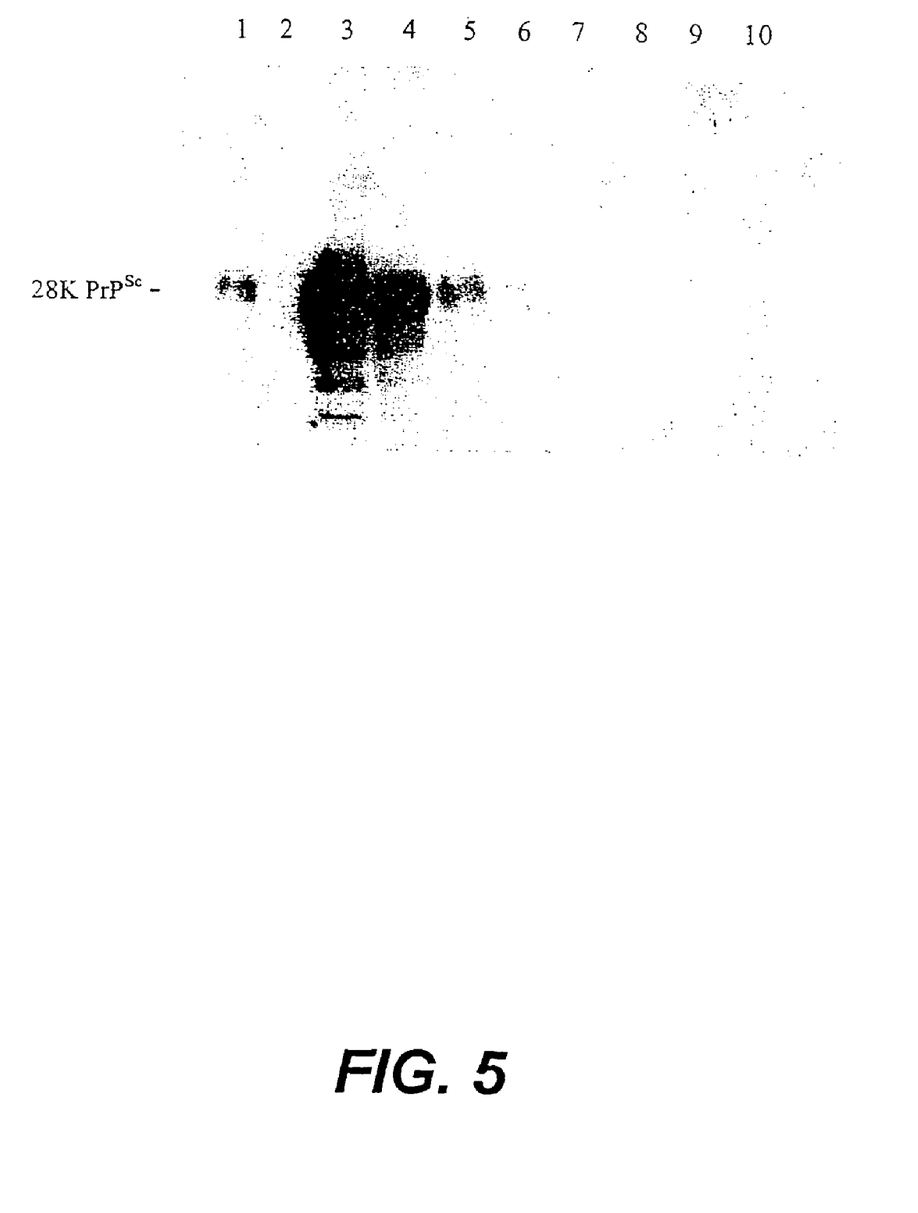
FIG. 5: Titration of 263K stock SP0172200. Lane 1: Proteinase.: Use K digested 263K Hs stock, $10^{-2.1}$. Lane 2: Undigested 263K Hs stock, $10^{-2.1}$ Lane 3: Low Molecular ratio rainbow markers. Lanes 4-10: Serial 5-fold dilutions of proteinase K digested 263K stock, from $10^{-1.4}$ to $10^{-5.6}$ dilution respectively.

FIG. 5 shows a titration of the 263K hamster adapted scrapie stock used in these studies (SP0172200). This shows the typical staining pattern observed for 263K, using mAb 3F4. The full length mature PrP protein is believed to have an apparent molecular ratio ($M_r$) of ~33,000 daltons (33K, top band lane 2). Following proteinase K digestion, a predominant broad band in the region of 28K, a fainter broad band ~23K, and a sharp but faint band ~19K, are usually observed (see lane 1). Note that in stocks of 263K Hs, these lower molecular weight species malt also be detected (lane 2), presumably due to endogenous proteases present in, or during the preparation of the stock.

Processed samples were tested at neat dilution only, either without digestion of following digestion with proteinase K at a final concentration of 10 μg/mL (based on previous results). The results are shown in FIGS. 6 and 7.

Figure 6:
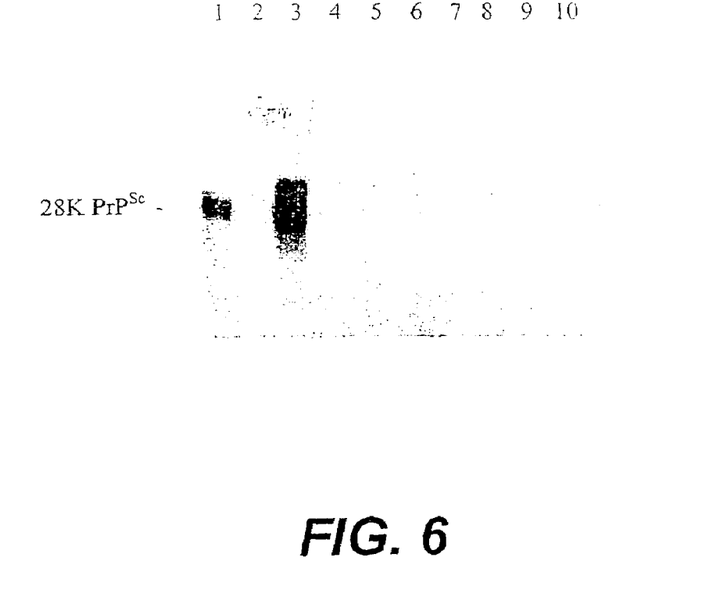
FIG. 6: Western blot analysis of proteinase K-digested samples. Lane 1: positive control at $10^{-2.8}$ dilution. Lane 2: molecular weight markers. Lane 3: sample 309.1A. Lane 4: blank. Lanes 5-10:.samples 309.1-1.3, 309.1-1.6, 309.1-2.3, 309.1-3.3, 309.1-4.3 and 309.1-4.3, respectively.
Figure 7:
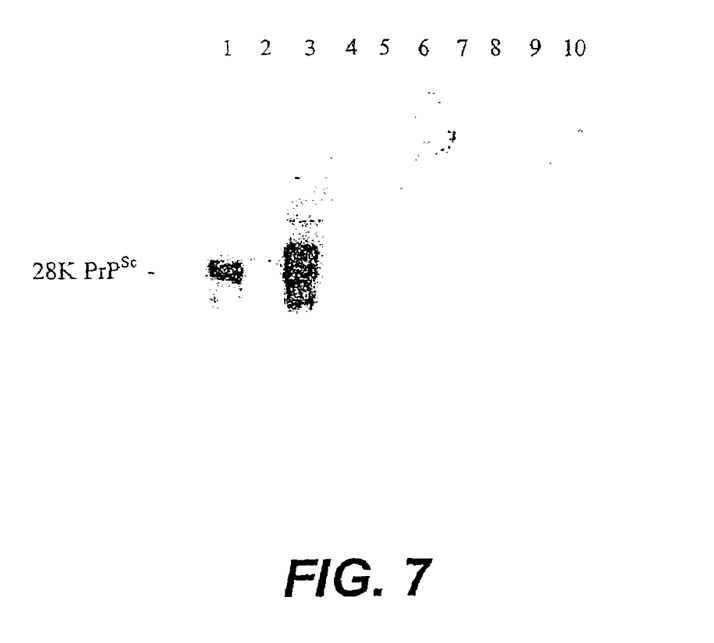
FIG. 7: Western blot analysis of proteinase K-undigested samples. Lane 1: positive control at $10^{-2.8}$ dilution. Lane 2: molecular weight markers. Lane 3: sample 309.1A. Lane 4: blank. Lanes 5-10:.samples 309.1-1.3, 309.1-1.6, 309.1-2.3, 309.1-3.3, 309.1-4.3 and 309.1-4.3, respectively.

Proteinase K digested 263K cHs stock SP0172200 served as an internal positive control (lane 1 of FIG. 6). The 28K PrP species can be seen clearly in sample 309.1A (both with and without proteinase K digestion; see lane 3 of FIGS. 6 and 7). A number of additional protein species are observed in the undigested sample. The 33K PrP species is still visible following proteinase K digestion (lane 3 FIG. 6) suggesting that proteinase K digestion was incomplete.

No protein bands were observed in any of the calcium hydroxide and heat-treated samples (lanes 5-10), either with or without proteinase K digestion, even on longer exposures of the western blots (up to 30 minutes. Thus, all of the calcium hydroxide and heat-treatment regimes tested in this study removed the $PrP^{Sc}$ proteins. As no $PrP^{Sc}$ species are observed for these samples, they can be taken to have an end-point titre of $10^{21}$ or $1 \times 10^0$ arbitrary units per mL. Note that no estimate of the titre can be made for the 309.1A sample.

The level of PrP proteins present in the processed samples was not quantified by titration in the western blot assay. However, although no PrP could be detected in any of the calcium hydroxide and heat-treated samples, an estimate of clearance in comparison to the estimated 263K spike can be made.

The $\log_{10}$ clearance factor is the ratio of the total amount of 263K spiked into the starting meat material, to the total amount of 263K recovered in the final, treated sample expressed as a $\log_{10}$ value:

$$\text{Clearance} = \frac{\text{stock titre} \times \text{spike volume}}{\text{sample titre} \times \text{sample volume}}$$

For all of the treated samples, a clearance factor of ≧3.4 logs was achieved. These calculations are summarized in Table 2.

In conclusion, 263K Hs was spiked into samples of minced beef and the effect of calcium hydroxide and heat-treatment according to the present invention measured in terms of $PrP^{Sc}$ protein elimination. The positive results reported herein suggest that the method of the invention is a robust procedure for the removal or inactivation of TDE from meat samples used in the production of animal feed.

It will be appreciated by the skilled person that the present invention is not limited to the embodiments described in detail herein, and that a variety of other embodiments may be contemplated which are nevertheless consistent with the broad spirit and scope of the invention All scientific and patent literature referred to in this specification is incorporated herein by reference.

TABLE 1

| Sample | Description | pH |
|---|---|---|
| 309.1A | Lean Minced beef spiked with 263 K cHs (control) | 6.5 |
| 309.1-1.3 | Sample treated at pH 10.5, 75° C., for 3 hours | 8.8 |
| 309.1-1.6 | Sample treated at pH 10.5, 75° C. for 6 hours | 8.8 |
| 309.1-2.3 | Sample treated at pH 10.5, 60° C., for 3 hours | nd. |
| 309.1-3.3 | Sample treated at pH 10.5, 90° C., for 3 hours | 8.2 |
| 309.1-4.3 | Sample treated at pH 12.0, 75° C., for 3 hours | 11.6 |
| 309.1-4.6 | Sample treated at pH 12.0, 75° C., for 6 hours | 11.5 |

TABLE 2

| Sample | Titre (a.u per ml) | Volume (ml) | Total (a.u per ml) | Clearance ($\log_{10}$) |
|---|---|---|---|---|
| Spike | $7.8 \times 10^4$ | 1 | $7.8 \times 10^4$ | — |
| 309.1-1.3 cHs | $1 \times 10^0$ | 30 | $3.0 \times 10^1$ | ≧3.41 |
| 309.1-1.6 cHs | $1 \times 10^0$ | 25 | $2.5 \times 10^1$ | ≧3.49 |
| 309.1-2.3 cHs | $1 \times 10^0$ | 30 | $3.0 \times 10^1$ | ≧3.41 |
| 309.1-3.3 cHs | $1 \times 10^0$ | 26 | $2.6 \times 10^1$ | ≧3.48 |
| 309.1-4.3 cHs | $1 \times 10^0$ | 20 | $2.0 \times 10^1$ | ≧3.59 |
| 309.1-4.6 cHs | $1 \times 10^0$ | 15 | $1.5 \times 10^1$ | ≧3.72 |

The invention claimed is:

1. A method of manufacturing an animal feed including the steps of:

(i) adding alkali to animal material to maintain a pH of at least 8.5;

(ii) heating the material at step (i) to a temperature in the range 60° C. to 99° C. to achieve alkali hydrolysis of protein present in the animal material; and (iii) dehydrating the material produced at step (ii) wherein the duration of steps (i) and (ii) is 1 to 4 hours;

wherein steps (i) and (ii) effectively sterilize the animal feed with respect to any transmissible degenerative encephalopathies present and wherein each of steps (i), (ii) and (iii) are performed at atmospheric pressure.

2. The method of claim 1, wherein the pH is at least 9.5.

3. The method of claim 1, wherein the pH is in the range 10.5 to 13.

4. The method of claim 3, wherein the pH is in the range 11.0 to 11.5.

5. The method of claim 1, wherein the temperature is 60° C.

6. The method of claim 1, wherein the temperature is in the range 80° C. to 85° C.

7. The method of claim 1, wherein the duration of steps (i) and (ii) is 1 to 3 hours.

8. The method of claim 7, wherein the duration of steps (i) and (ii) is 1 to 2 hours.

* * * * *

UNITED STATES PATENT AND TRADEMARK OFFICE
CERTIFICATE OF CORRECTION

PATENT NO. : 7,618,673 B2  Page 1 of 1
APPLICATION NO. : 10/416602
DATED : November 17, 2009
INVENTOR(S) : Philip William Kemp It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this

Twenty-sixth Day of October, 2010

David J. Kappos
*Director of the United States Patent and Trademark Office*